United States Patent
Stuker

[11] Patent Number: 6,029,502
[45] Date of Patent: Feb. 29, 2000

[54] POSITIONING SYSTEM WITH PRESSURE MEASUREMENT IN THE LAYER OF AIR BETWEEN THE MEASURING HEAD AND THE MATERIAL BEING MEASURED

[75] Inventor: Peter Stuker, Dietlikon, Switzerland

[73] Assignee: Hch. Kuendig & Cie AG, Wetzikon, Switzerland

[21] Appl. No.: 08/832,993

[22] Filed: Apr. 4, 1997

[30] Foreign Application Priority Data

Apr. 9, 1996 [CH] Switzerland ................ 892/96

[51] Int. Cl.[7] ................................ G01B 13/04
[52] U.S. Cl. ..................... 73/37.7; 33/501.02
[58] Field of Search ................. 73/37.7, 37.8; 33/501.02, 501.03, 501.04

[56] References Cited

U.S. PATENT DOCUMENTS

| | | | |
|---|---|---|---|
| 3,818,327 | 6/1974 | Alexander | 33/147 L X |
| 4,647,855 | 3/1987 | Berglund | 73/37.7 X |
| 5,021,655 | 6/1991 | Weismuller . | |
| 5,298,073 | 3/1994 | Wilson | 73/37.7 X |
| 5,575,078 | 11/1996 | Moulton | 33/501.02 X |

FOREIGN PATENT DOCUMENTS

| | | |
|---|---|---|
| 0214100A1 | 3/1987 | European Pat. Off. . |
| 0463255A2 | 1/1992 | European Pat. Off. . |
| 3612914A1 | 10/1987 | Germany . |
| 2084735A | 4/1982 | United Kingdom . |

*Primary Examiner*—Joseph L. Felber
*Attorney, Agent, or Firm*—Townsend and Townsend and Crew LLP

[57] ABSTRACT

The object of positioning a measurement probe (5) very close to but not in contact with moving measured material (9) is solved in accordance with the invention in that air is blown through a nozzle in the measurement probe between the probe and the material being measured, and in that the pressure in the flowing medium between the measurement probe and the material being measured is measured, and from this a regulation signal is derived for the spacing. The air cushion which forms between the material being measured and the measurement probe, on the one hand, prevents mutual contact and additionally serves as a medium in the measuring system for the measurement of the spacing.

21 Claims, 2 Drawing Sheets

POSITIONING SYSTEM WITH PRESSURE MEASUREMENT IN THE LAYER OF AIR BETWEEN THE MEASURING HEAD AND THE MATERIAL BEING MEASURED

BACKGROUND OF THE INVENTION

The invention relates to an apparatus for determining the spacing, of a change in the spacing, between two bodies and also to its use in a thickness measurement apparatus.

It is known to measure distance with an air jet directed onto a body whose position is to be determined using a nozzle. The air bouncing back from the body stagnates in a chamber surrounding the nozzle. The stagnation pressure is measured and forms a measure of the spacing between the nozzle and the body.

Such distance measuring systems are used in various fields. The spacings to be measured range in the order of magnitude from a few millimeters down to a few nanometers. One use is, for example, for the determination of the axial position of a shaft. In another application the spacing of a lithographic writing head from the surface on which writing is to take place is measured.

A particularly advantageous use of such a distance measurement would result in the thickness measurement of a foil. In all previous applications the spacing is measured from a hard surface which cannot be deformed by the air jet. However, the previous embodiments are not suitable if the distance to a readily deformable surface is to be measured.

A hitherto unsolved problem lies in measuring the thickness of a foil without contact or from only one side. Several methods are known for the measurement of the thickness of a foil. In the following a surface or a surface surrounding a three-dimensional body, of plastic, metal, fabric, paper, etc. or of composites thereof, will be termed a foil. In the manufacture of plastic foils by blow extrusion it is, as a rule, only the outer side of the foil tube which is accessible for the measurement. The thickness of an electrically non-conductive foil is, for example, measured by means of a capacitive probe (measurement head). In this respect the measurement head is formed as a capacitor, the scattering field of which is influenced by the foil. If the capacitor is part of an oscillating circuit, then a different resonant frequency results, depending on the thickness of the foil. The thickness of the foil can be determined by measurement of this frequency.

Since the scattering field can only be adequately influenced in the vicinity of the measurement head (spacing smaller than 0.3 mm), the size of the spacing between the measurement head and the foil is critical. Changes of the spacing generate a measurement error for the thickness measurement. In order to avoid changes in spacing, the simplest solution is to choose a spacing of zero, i.e. the measurement head contacts the foil. For the continuous thickness measurement at the foil during production, the foil slides past the measurement head. Since the rubbing of the measurement probe on the foil can leave a trace or even tear the foil hose, rubbing must be kept as low as possible. Certain types of foil require contact-free measurement of the thickness (and thus also contact-free measurement of the spacing from the foil).

This is achieved in accordance with the prior art by generating an air cushion between the foil and the measurement head.

Another measurement principle, for example beta or gamma back-scattering, can be used for thickness measurements. In this method the spacing between the measurement head and the foil can amount to about 1 cm. Changes of the spacing by more than +/- 1 mm, however, also generate a pronounced measurement error which should be avoided. This spacing can be kept constant with mechanical spacers. In order to keep the friction low such, spacers are provided in the prior art with rollers. With particularly sensitive foils, however, even contact by rollers is not desired.

In measurement processes using radioactive radiation, it is usually not the thickness of the foil which is, determined, but rather the weight per unit area which is proportional to the thickness.

SUMMARY OF THE INVENTION

It is an object of the invention to provide an apparatus with which small spacings between two bodies can be measured. In particular the invention makes it possible to measure the spacing to a very soft, elastic and/or indeed plastically readily deformable body, for example to a plastic foil or to the surface of a liquid. The construction of the spacing measurement device can be adapted to the flat material being measured which is deformable by the air jet in that a surface is formed at the outlet of the nozzle so that an air cushion with a laminar air flow can form between this surface of the nozzle and the flat object to be measured. The pressure which forms at the center of the air cushion, and thus also in the air supply to the outlet opening, is approximately proportional to the surface formed. The stagnation pressure does not have to be measured outside of the nozzle and can also be measured in the feedline to the nozzle. The air pressure can also be measured in the air cushion in that at least one further bore through which air is supplied to the pressure sensor is made in the surface which surrounds the nozzle. The pressure sensor could also be directly made at one of the surfaces which form the boundary of the air cushion. It is also possible to simultaneously use a plurality of pressure sensors.

The object of positioning a measurement probe very close ($0<d<0.3$ mm) to a material to be measured but which does not contact it is solved in accordance with the invention in that the pressure in the medium between the measurement probe and the material to be measured is determined, and from this a signal reflecting the spacing is derived. The air between the material to be measured and measurement probe thus serves not only to prevent or reduce the friction, but additionally serves as a medium in the measurement system for the spacing measurement and regulation.

In preferred embodiments the measurement probe is used for the thickness measurement of foils. The spacing measurement and regulation can, however, also be combined with any other desired apparatus for which a distance positioning system is necessary.

In the apparatus of the invention air is used as the flowing medium. However, any other desired gas or any other flowing medium can be used in place of air, for example water, for the distance measurement.

In the manufacture of plastic foils by means of blow extrusion the foil hose is moved substantially by the cooling air. Accordingly, the wall of the foil can move rapidly towards the measurement device or away from it. With contact measurement the measurement head must therefore be pressed relatively hard against the foil hose so that it does not lift off from the latter. In order to reliably avoid contacting the foil during contact-free thickness measurement despite this movement, the air flow, or the pressure in the air cushion, must be sufficiently high. As a result, a trace can show in the blown foil. The pronounced movements of the foil also cause fluctuations of the air gap width, which results in thickness measurement are errors.

To overcome the disadvantages, the position of the measurement head relative to the foil is so regulated in accordance with the invention that it follows the movements of the foil. For the measurement and regulation of the position of the measurement head relative to the foil a parameter is used which is derived from the air pressure in the air supply to this air cushion. In order for the positioning to take place sufficiently rapidly, the measurement head is, for example, moved with a DC linear motor.

DESCRIPTION OF THE PREFERRED EMBODIMENTS

Figure 1:
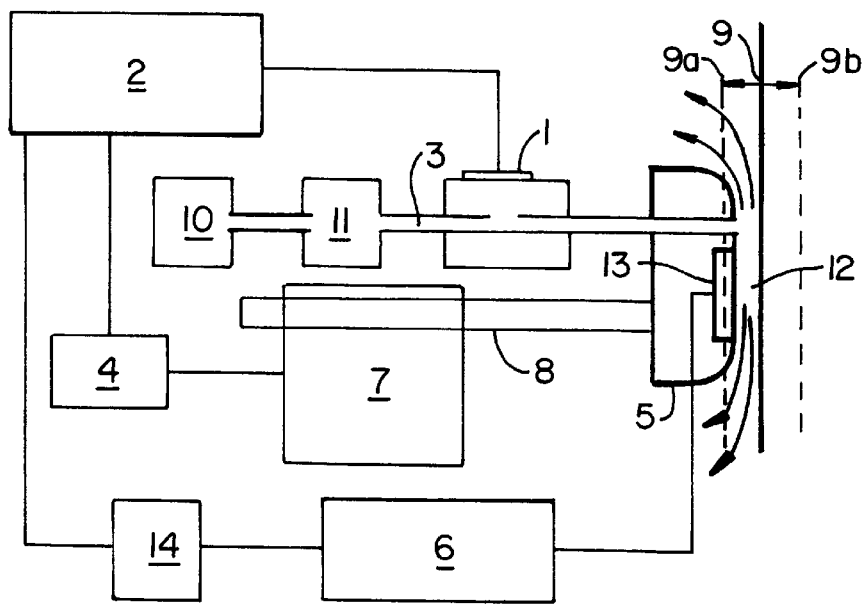
FIG. 1 is a schematic illustration of a complete system made in accordance with the invention for controlling the position of a measuring head at a short distance from a foil and of a system to measure the thickness of the foil.

The invention is shown with respect to the schematic illustration in FIG. 1. A measurement head 5 for the measurement of the thickness of a foil 9 is positioned with the aid of a motor 7 in the vicinity of the foil. The measurement head contains a sensor 13 for the thickness measurement or forms a sensor as a whole, in correspondence with the prior art. Air is supplied to the measurement head by a pump 10 and leaves the latter at the foil side via nozzles. As soon as the measurement head comes close to the foil an air cushion is generated by the air supplied through the nozzles, which holds the spacing between the foil and the measurement head stable in the sub-millimeter range. The pressure is measured in the air supply by pressure measuring cell 1. In order that pressure fluctuations cannot be transferred from the periodically operating pump to the pressure measuring cell, a pressure equalizing chamber 11 can be connected in series which forms a low-pass filter for the pressure fluctuations.

The pressure which is measured comprises a static component and a dynamic component. If air is blown in, then a specific constant pressure (static component) results which depends on the distance (spacing) of the two bodies. Through the mutual movement of the bodies towards one another or away from one another a pressure change (dynamic component) arises which is independent of whether air is blown into the gap or not. The pressure change is dependent on the speed of movement, on the spacing and on the size of the air cushion area. A further periodically fluctuating component can originate from the periodically operating air pump. If this is not filtered out by a pressure equalizing vessel, then it can be detected by a pressure sensor in the air line close to the pump and compensated for electronically or mathematically.

Figure 2:
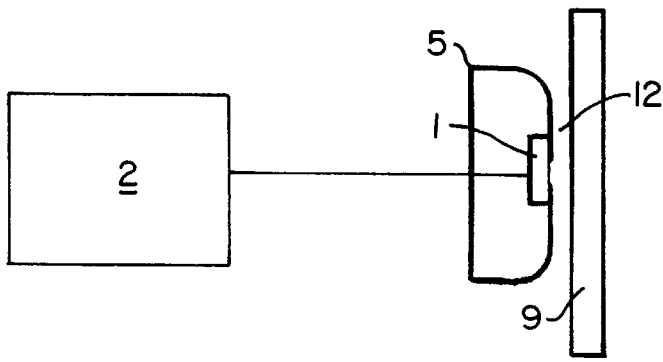
FIG. 2 shows the arrangement for measuring the distance between two bodies with no air supply.

FIG. 2 shows an arrangement for the distance measurement between two bodies 5, 9 without air supply. This arrangement is sufficient in order to detect the changes of the pressure in the air gap 12 between the two bodies.

Figure 3:
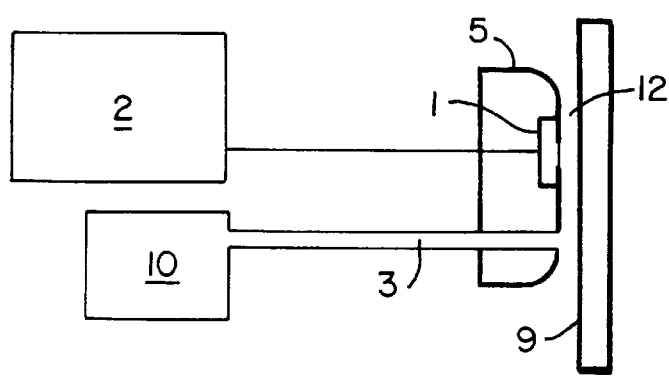
FIG. 3 shows the arrangement for measuring the distance between two bodies with an air supply.

FIG. 3 shows an arrangement for the distance measurement between two bodies 5, 9 with an air supply 3 through which air from a pump 10 flows to the air gap 12. In this way an air cushion is built up whose static pressure represents a measure for the average spacing of the two bodies 5, 9.

As FIG. 1 shows, the pressure fluctuations are picked up by pressure measurement cell 1 and are compared by the associated electronic circuit 2 with a desired value. The difference is passed on to a regulator and amplifier 4 which controls motor 7. The motor moves the measurement head via a linearly guided mechanical system 8 so that the pressure in the air cushion, or the air supply thereto, achieves the desired pressure again, which means that the measurement head follows the movements of the foil to be measured. The movement space 9a, 9b of the foil can amount to a distance of a few millimeters to a few centimeters. Since the fluctuations of the foil take place with a speed of several Hertz, the measurement head must be capable of being very quickly and precisely positioned. The rapid positioning advantageously takes place with a linear motor. Larger and slower movements of the foil can be compensated for with a more slowly operating telescopic system, which carries the entire, faster operating system and receives control signals from the latter and can move it over a much larger distance of up to 2 m.

Figure 4:
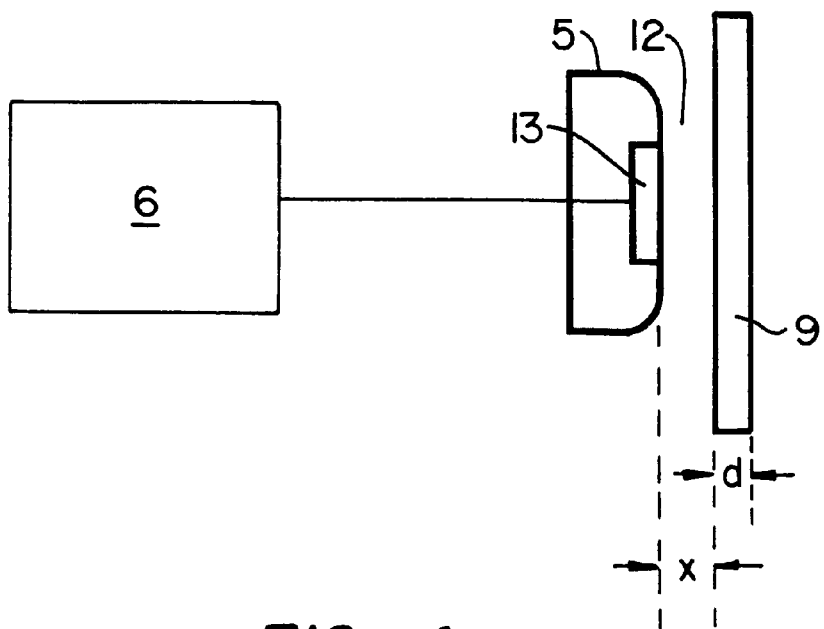
FIG. 4 and FIG. 5 show a possible dependence of the thickness measurement on the spacing between the measurement head and the foil.
Figure 5:
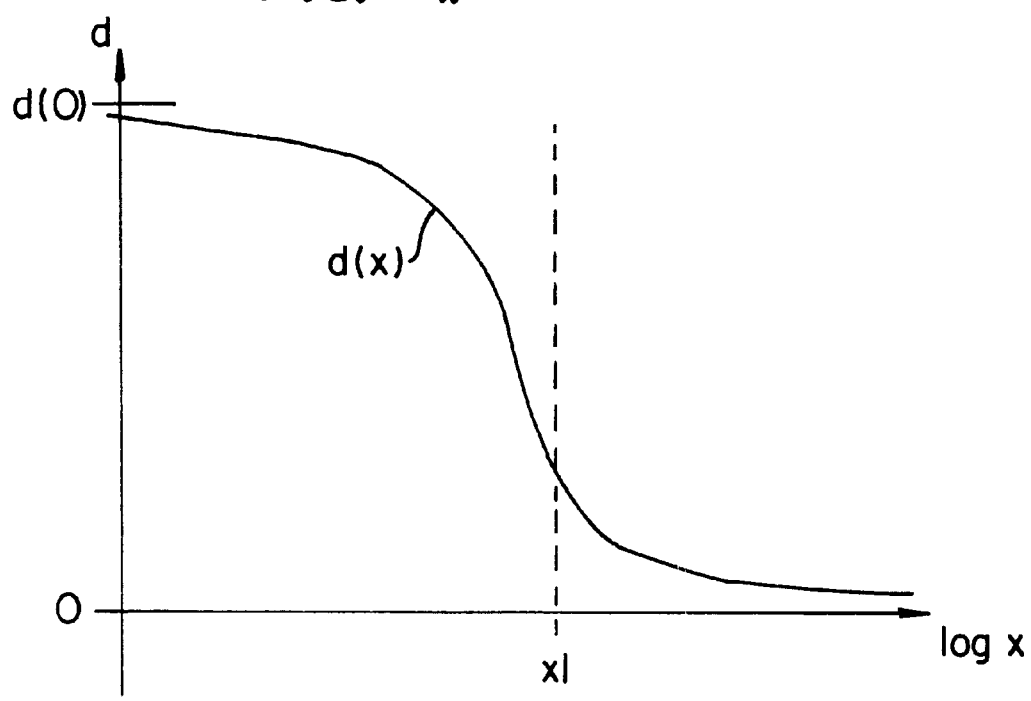

The actual thickness measurement of the foil takes place independently of the distance measurement and/or regulation. During the thickness measurement with a capacitive sensor in accordance with the prior art a measurement error arises if the measurement head does not directly contact the foil. FIGS. 4 and 5 show a possible dependence of this measurement error on the spacing between the measurement head and the foil. If the shape of this curve is known, at least section-wise, and if x, the spacing between the measurement head and the foil is measured, the corrected foil thickness can be determined from this in a correction unit 14 that is coupled to sensor 13 via an evaluation circuit 6. This correction can take place instead of or in addition to the spacing regulation. The dependency can, for example, be assumed to be $d(x)=d(x=0)/(1+x)$, with "d" being the measured thickness and "x" the spacing between the measurement head and the foil.

For the combination of the distance measurement with a thickness measurement using the capacitive principle, the sensor for the spacing can be advantageously combined with the sensor for the thickness in the same measuring head. As FIG. 1 shows, this can be done simply by providing the thickness measurement head 5 with at least one air outlet or inlet opening through which air communication exists between air gap 12 and pressure sensor 1.

For all other applications the two sensors can be built up independently of one another and can also be moved independently of one another. For the thickness measurement with a radioactive measurement principle the spacing sensor alone can be of very light construction and can be positioned with a distance of 0.2 mm from the foil, for example, with a positioning accuracy of +/− 0.1 mm. Its position and thus the instantaneous position of the foil relative to a reference plane can be electronically detected with a system based on the Hall principle. Mechanically independent of this, the thickness measurement device with the radioactive source, the radiation sensor and the screen can be positioned at a spacing of 5 to 10 mm from the foil with an allowed inaccuracy of +/−1 mm. Since the thickness sensor can be substantially heavier than the spacing sensor, it is advantageous to fully exploit the permitted positioning inaccuracy.

What is claimed is:

1. Apparatus for determining a spacing and/or a change in spacing between first and second bodies formed by a gap between the bodies filled with air and extending in a first direction, the second body moving past the first body in a second, feed direction which is transverse to the first direction, the apparatus comprising a sensor for determining a pressure and/or a change in pressure of the medium in the gap between the bodies while the second body moves in the second direction and generating a signal which reflects the pressure and/or the change in pressure, an electronic measurement circuit which receives the signal and derives therefrom a value indicative of the spacing and/or the change in the spacing between the bodies, wherein the first body comprises a thickness measuring head.

2. Apparatus in accordance with claim 1 including an air supply device for generating an air cushion in the gap.

3. Apparatus according to claim 2 wherein the sensor measures the pressure and/or the change in the pressure in the air supply device generating the air cushion.

4. Apparatus according to claim 1 wherein the measuring head comprises at least one air outlet or inlet opening for establishing communication between the air in the gap and the pressure sensor.

5. Apparatus for determining a spacing and/or a change in spacing of a gap between a first body and a second, readily deformable body suspended in a fluid medium, the apparatus comprising a sensor for determining a pressure and/or a change in pressure of the medium in the gap between the bodies and generating a signal which reflects the pressure and/or the change in pressure, an electronic measurement circuit which receives the signal and derives therefrom a value indicative of the spacing and/or the change in the spacing between the bodies, a regulating unit receiving the value and generating an output therefrom which defines a desired setting value for the spacing and/or the change in spacing between the bodies, a drive receiving the output and therewith positioning at least one of the bodies so that it is at a desired specific spacing from the other one of the bodies, and means for suspending the second readily deformable body in the fluid medium.

6. Apparatus according to claim 5 wherein the fluid medium is air and including an air supply device generating an air cushion in the gap between the bodies.

7. Apparatus according to claim 6 wherein the first body comprises a thickness measuring head comprising at least one air outlet or inlet opening communicating the air in the gap and the pressure sensor.

8. Apparatus according to claim 7 wherein the second body comprises a foil, wherein the thickness measuring head determines a thickness of the foil by using at least one of a capacitive measurement method and a method which makes use of the back scattering of beta radiation and/or gamma radiation and generates a corresponding thickness measurement signal, and including an evaluation circuit, and means directing the thickness measuring signal from the measuring head to the evaluation circuit.

9. Apparatus according to claim 7 including a positioning device for the thickness measurement head at a specific spacing from a foil to be measured, and one of a linear DC motor having a mechanical device for transferring motions of the DC motor to and positioning the thickness measuring head relative to the foil, and a pneumatically driven apparatus having a mechanical device for transferring motions of the pneumatically driven apparatus to and positioning of the thickness measuring head relative to the foil.

10. Apparatus according to claim 5 wherein the second body has a thickness, and wherein the first body comprises a thickness measuring head for measuring the thickness of the body and generating a measurement value which is a function of the thickness of the second body and which deviates from a correct measurement value as a result of a change in the spacing between the measuring head and the second body, and including a correction unit receiving the measurement value for adjusting the measurement value and thereby generating the correct measurement value.

11. Apparatus according to claim 5 wherein the drive can position the at least one of the bodies over a distance of several centimeters, and including a device carrying the drive for telescopically moving the drive to therewith position at least one of the bodies relative to the other one of the bodies over a distance of up to 2 meters.

12. Apparatus for determining a thickness of a foil employing a spacing and/or a change in spacing between a thickness measuring head and the foil formed by a gap between the bodies filled with air, the gap extending in a measurement direction of the measuring head and the foil being readily deformable in at least the measurement direction, the apparatus comprising a sensor for determining a pressure and/or a change in pressure of the medium in the gap and generating a signal which reflects the pressure and/or the change in pressure, an electronic measurement circuit which receives the signal and derives therefrom a value indicative of the spacing and/or the change in the spacing between the thickness measuring head and the foil wherein the thickness measuring head determines the thickness of the foil by using at least one of a capacitive measurement method and a method which makes use of the back scattering of beta radiation and/or gamma radiation and generates a corresponding thickness measurement signal, and further including an evaluation circuit, and means directing the thickness measuring signal from the measuring head to the evaluation circuit, and means for positioning the foil such that it is readily deformable in at least the measurement direction.

13. Apparatus for determining a spacing and/or a change in spacing formed by a fluid medium filled gap between a readily deformable, sheet-like body not attached to a support surface and a thickness measuring head for measuring the thickness of the body, the apparatus comprising a sensor for determining a pressure and/or a change in pressure of the medium in the gap and generating a signal which reflects the pressure and/or the change in pressure, an electronic measurement circuit which receives the signal and derives therefrom a value indicative of the spacing and/or the change in the spacing, and wherein the thickness measuring head measures the thickness of the body and generates a measurement value which is a function of the thickness of the body and which deviates from a correct measurement value as a result of a change in the spacing between the measuring head the body, and further including a correction unit receiving the measurement value for adjusting the measurement value and thereby generating the correct measurement value, and means for positioning the foil such that it is readily deformable while the thickness is measured.

14. Apparatus for maintaining a gap of desired, substantially constant size extending in a first direction between a body and a readily deformable foil moving in a second direction, there being a fluid medium in the gap having a pressure which is a function of the size of the gap, the apparatus comprising a sensor for determining pressure changes in the medium in the gap resulting from relative movements of the body and the moving foil towards and away from each other and generating signals which reflect the pressure changes, an electronic measurement circuit which receives the signals and derives therefrom a value indicative of deviations in the size of the gap from the desired, substantially constant size thereof, a regulating unit receiving the value and therewith generating an output which defines an amount by which one of the body and the moving foil must be moved in the first direction towards or away from the other to return the gap to its desired, substantially constant size, and a drive receiving the output and therewith repositioning at least one of the body and the foil in the first direction until the gap has the desired, substantially constant size.

15. Apparatus according to claim 14, wherein the pressure changes occur at a rate of several Hertz, and wherein the drives reposition at least one of the body and the foil at the rate of several Hertz.

16. Apparatus for determining a spacing and/or a change in spacing of a gap extending in a first direction between a first body and a surface of a second body that is readily deformable in the first direction and moves past the gap in a second transverse direction, the gap being filled with a fluid medium, the apparatus comprising a sensor for determining a pressure and/or a change in pressure of the medium in the gap and generating a signal which reflects the pressure and/or the change in pressure, an electronic measurement circuit which receives the signal and derives therefrom a value indicative of the spacing and/or the change in the spacing between the first body and the surface of the second body while it moves in the second direction, a regulating unit receiving the value and generating an output therefrom which defines a desired setting value for the spacing and/or the change in spacing between the first body and the surface of the second body, and a drive receiving the output and keeping the position of the surface of the second body, while it moves in the second direction, at a desired specific spacing from the first body.

17. Apparatus according to claim 16 wherein the second body comprises a suspended thin film of a material moving past the first body.

18. Apparatus according to claim 16 wherein the second body comprises a film having a second surface facing away from the first body which is in contact with a fluid medium.

19. Apparatus for determining a spacing and/or a change in spacing between a measuring head and a thin film moving past the head in a feed direction, the film being deformable in a lateral direction generally perpendicular to the feed direction towards or away from the head, the head and a surface of the film facing the head defining a gap extending in the lateral direction between them filled with a fluid medium, the apparatus comprising a sensor for determining a pressure and/or a change in pressure of the medium in the gap while the film moves in the feed direction and generating a signal which reflects the pressure and/or the change in pressure, an electronic measurement circuit which receives the signal and derives therefrom a value indicative of the spacing and/or the change in the spacing between the head and the film, a regulating unit receiving the value and generating an output therefrom which defines a desired setting value for the spacing and/or the change in spacing between the head and the film, and a drive receiving the output and repositioning the head as a function of the output so that the head substantially follows movements of the film in the lateral direction to thereby maintain a desired specific spacing between the head and the film.

20. Apparatus according to claim 19 including means for measuring the thickness of the film.

21. A method of measuring a thickness of a readily deformable foil having first and second surfaces and moving in a feed direction past a measuring station, the method comprising the steps of positioning a measurement head at the measuring station, contacting the first and second surfaces of the foil with a fluid medium, establishing a desired spacing between a first surface of the foil facing the measurement head and the measurement head, sensing a pressure and/or a change in pressure in the fluid medium between the first foil surface and the measurement head, generating a signal which reflects the pressure and/or a change in pressure in the medium between the first surface and the measurement head, deriving a value from the signal which is indicative of the spacing and/or the change in the spacing between the first surface and the measurement head, generating an output from the value which reflects a deviation in the spacing between the first surface and the measurement head from the desired spacing, and moving at least one of the foil and the measurement head as a function of the output until the desired spacing between the first surface and the measurement head has been reestablished.

* * * * *